United States Patent

Kaneko

[15] 3,697,874

[45] Oct. 10, 1972

[54] MULTILEVEL CODE CONVERSION SYSTEM

[72] Inventor: Hisashi Kaneko, Tokyo, Japan

[73] Assignee: Nippon Electric Company, Limited, Tokyo, Japan

[22] Filed: June 6, 1969

[21] Appl. No.: 831,143

Related U.S. Application Data

[63] Continuation-in-part of Ser. No. 693,499, Dec. 12, 1967, Pat. No. 3,560,856.

[30] Foreign Application Priority Data

June 14, 1968 Japan ......................43/41251
June 14, 1968 Japan ......................43/41250

[52] U.S. Cl. ..............325/38 A, 178/68, 340/347 DD

[51] Int. Cl. ....................................................H04l 3/00

[58] Field of Search......340/146.1; 178/68, 69, 69 D; 325/38, 38 A, 41, 42, 44; 328/57, 127; 317/8; 235/183

[56] References Cited

UNITED STATES PATENTS

| | | | |
|---|---|---|---|
| 3,521,274 | 7/1970 | Sawai | 325/38 A X |
| 1,921,022 | 8/1933 | Burton | 178/79 D |
| 2,281,891 | 5/1942 | Terry | 178/7.1 |
| 3,201,705 | 8/1965 | Hanulec et al. | 328/127 X |
| 3,369,229 | 2/1968 | Dorros | 340/347 |
| 3,405,235 | 10/1968 | Carter | 340/146.1 |
| 3,484,593 | 12/1969 | Schmoock et al. | 235/183 |

*Primary Examiner*—Benedict V. Safourek
*Attorney*—Sandoe, Hopgood and Calimafde

[57] ABSTRACT

A PCM code conversion and transmission system in which a code signal representative of an information signal is transmitted in the form of a train of multilevel pulses spaced by a clock pulse interval. A plurality of groups of pulses are extracted from the train at a predetermined interval equal to an integral multiple of the clock pulse interval, the groups having a time lag of one clock pulse interval from one group to another, and each group independently integrated. Means are provided for inverting the polarity of at least one level of the multilevel pulses in response to the time integration in each group to cancel the DC component and eliminate select frequency spectrum components.

8 Claims, 10 Drawing Figures

INVENTOR.
Hisashi Kaneko by
Sandoe, Hopgood & Calimafde
ATTORNEYS.

INVENTOR.
Hisashi Kaneko by
Sandoe, Hopgood & Calimafde
ATTORNEYS.

MULTILEVEL CODE CONVERSION SYSTEM

This application is a continuation-in-part of my copending application Ser. No. 693,499, now U.S. Pat. No. 3,560,856.

BACKGROUND OF THE INVENTION

As those knowledgeable in the art are aware, a transmission line which employs repeaters is not capable of transmitting a direct current component of a signal to be transmitted due to the existence of the transformers in each of the repeaters and therefore considerable difficulty is encountered when a digital signal is to be transmitted. Particularly when a random binary code signal is to be transmitted, the error rate increases due to the fluctuation of the direct current level. To solve this problem, a system has been proposed, as is well known, in which the direct current component is eliminated by transmitting a code "1", for example, as a pseudo-three-valued pulse train (+1, −1, or 0) switched alternatively. Also, various coding methods are known in which the direct current components are eliminated by the combination of two or three digits; the details of such methods are described and disclosed in certain papers including the Proceedings of the 1966 Joint General Meetings of the Four Institutes of Electrical Engineers of Japan, No. 1670, and also in The Proceedings of the 1966 General Meetings of The Institute of Electrical-Communication Engineers of Japan, No. 1021.

However, the foregoing devices have the disadvantage that the circuits for converting the binary code at the transmitter into the pulse train to be transmitted, or for reproducing from the received pulse train the original binary code, necessarily become complex. Furthermore, no means has been found to overcome this disadvantage.

In the above mentioned co-pending application Ser. No. 693,499, I describe a feedback type conversion system including means for selectively varying the polarity of at least one of the multilevel pulses according to the time integration of pulses. While reference may be had to that application for greater detail, the concept which has been briefly described here should suffice for an understanding of the background of this invention.

OBJECT OF THE INVENTION

It is the object of the present invention to provide an improvement over the feedback-type code conversion system wherein desired frequency components of the spectrum can be suppressed to make it possible to utilize these vacant portions for transmission of timing, control, and other information.

The above mentioned and other features and objects of this invention and the manner of attaining them will become more apparent and the invention itself will best be understood by reference to the following description of embodiments of the invention taken in conjunction with the accompanying drawings, the description of which follows.

SUMMARY OF THE INVENTION

Briefly, the invention is predicated upon the concept of producing the time integration of each of a plurality of groups of pulses extracted from the train of multilevel pulses. The pulses in each group are extracted at an interval equal to an integral multiple of the clock pulse and the groups have a one clock pulse time lag from group to group. One level of the multilevel pulses is inverted dependent upon the time integration of the associated group, cancelling the DC component and eliminating predetermined frequency spectrum components.

DESCRIPTION OF PREFERRED EMBODIMENTS

Figure 1:
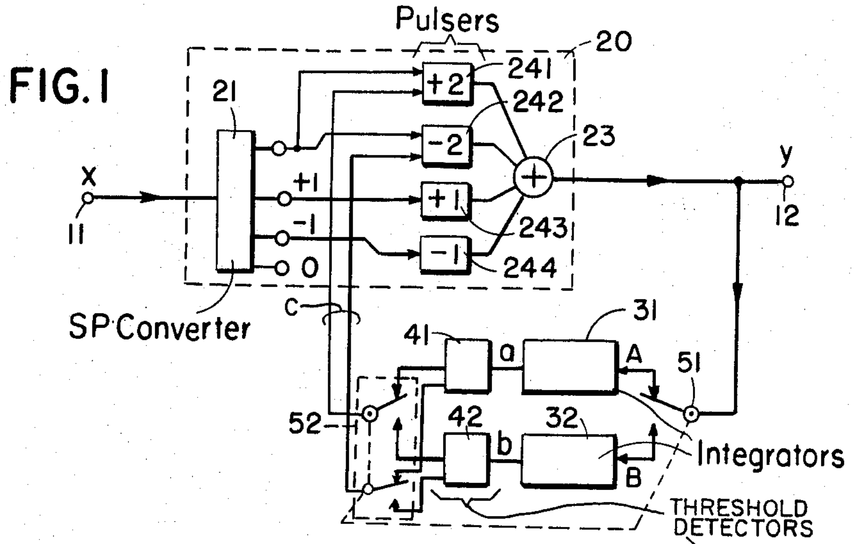
FIG. 1 is a schematic block diagram illustrating a multilevel code conversion system according to this invention.

Referring now to FIG. 1, input terminal 11 receives an incoming multilevel information signal $x$, such as a quaternary code having the values −1,0,+1, or 2 in each time slot. Dashed box 20 embraces the code converter elements for the polarity-reversal control of all or part of the level of input information $x$.

A description will now be given to the case where only the amplitude '2' of the quaternary code is polarity-controlled. The output y from output terminal 12 is derived as follows: serial to parallel converter 21 initiates a signal on one of four lines; for an incoming pulse of amplitude '0' it is zero; for an incoming pulse with the amplitude '−1', with output '−1' is developed by pulser 244; for incoming pulse with amplitude '+1', the output '+1' is developed from pulser 243. However, upon arrival of an input $x$ with amplitude '2', it will be seen that either pulser 241 or 242 is triggered to produce a pulse '+2' or '−2' depending on the value of the control signals C.

The output pulses from the pulsers 241 through 244 such, as blocking oscillators are added together by means of an adder 23 to deliver multilevel (quinary in this case) pulse train y to output terminal 12. The output $y$ is alternately distributed to two integrators 31 and 32 by switch 51 which oscillates at a frequency equal to one-half the clock frequency $fo$ of the pulse train, or at $fo/2$. Pulses in the odd-numbered and even-numbered slots are thus respectively distributed to the integrators 31 and 32 in channels A and B. Consequently, integrated waveforms $a$ and $b$ are respectively obtained. The terminology "odd-numbered" and "even-numbered" will be used for convenience in the disclosure. Therefore, the first ("odd-numbered") output pulse of the pulse train $y$ produced at output terminal 12 may be considered as the first pulse appearing at the terminal 12 just after operation of the composite code conversion apparatus is begun, or after any other reference point.

Threshold detectors 41 and 42 e.g., comparators with a zero level reference input, are each composed of tunnel diodes or a Schmitt circuit for developing true (e.g., +) or complementary (e.g., −1) depending on the polarity of the integrated waveform *a* and *b*. Each of the threshold detectors 41 and 42 operates in a manner such that the true or "+1" signal is generated when the input of the comparator is positive with respect to the reference (zero) level (not shown in FIG. 1), and the complementary output is generated when the input is negative.

Switch 52 is similar to switch 51 and also operates at the frequency *fo*/2 in such a manner that the output of the channel-A threshold detector 41 is derived in the odd-numbered time slots, whereas the output of channel-B threshold detector 42 is derived in the even-numbered time slots.

To state it differently, switches 51 and 52 operate to select the functional A-channel including integrator 31 and detector 41 during the odd-numbered time slots, and select the functional B-channel including integrator 32 and detector 42 during even-numbered time slots, the selection process proceeding in an alternating manner. Since the alternating switching operations of the switches 51 and 52 is well known per se, the apparatus for operating switches 51 and 52 is omitted in FIG. 1. In other words, the switch 51 distributes the multilevel output pulse into spacially separated (space domain) A and B channels, with alternate pulses going into the two channels. Similarly the switch 52, operating in synchronization with the switch 51, combines (interleaves) the A and B channel signals by alternately selecting the outputs of detectors 41 and 42 on a time division basis.

The functional operation of polarity control is as follows: the switch 52 enables the +2 pulser 241 when the output of integrator 41 is negative, and enables the output of the −2 pulser when the output of threshold detector 41 is positive during the A pulse group operation (the switches 51 and 52 in their upper position).

Similarly, when B pulse group operation is being effected (switches 51 and 52 in their lower position), the pulsers 241 and 242 are respectively enabled when the output of the threshold detector is negative or positive, thereby also obviating the DC value of pulses for B group processing.

Figure 2:
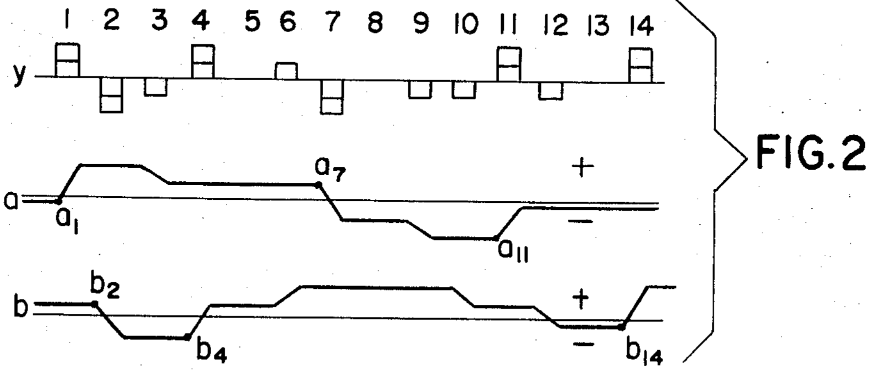
FIG. 2 shows waveform diagrams for illustrating the operation of the multilevel code transmission system shown in FIG. 1.

Turning now to FIG. 2 and examining the odd-numbered time slots in wave *y*: since $a_1$ happens to be negative in time slot 1, a pulse with amplitude '+2' occurs; since the integrated value $a_7$ is positive in the time slot 7, a pulse with amplitude '−2' occurs; and since $a_{11}$ is negative in time slot 11, a pulse with amplitude '+2' occurs. Similarly, pulses in the even-numbered slots are subjected to polarity control through channel B as follows: since $b_2$ happens to be positive in time slot 2, a pulse with amplitude '−2' occurs; since $b_4$ and $b_{14}$ are negative in time slots 4 and 14 respectively, pulses with amplitudes '+2' occur in time slots 4 and 14. In other words, pulse in channels A and B are respectively polarity-controlled so as to minimize the integrated values *a* and *b* by use of a negative feedback circuit. Thus, the so-called 'balanced' pulse train devoid of a d.c. component is available.

With the present code conversion system of controlling a train of pulses by distributing then into two channels, not only the d.c. component, but also the *fo*/2 component is suppressed. In contrast to the spectrum shown by dotted line $S_1$ in FIG. 3, which is obtained with the feedback-type code conversion systems disclosed in the above-mentioned copending application, a spectrum whose spectral density falls off sharply to zero at *fo*/2 as shown by $S_2$ is obtained by the use of this invention.

Since the channels A and B are controlled independently of one another using a series of odd- and even-numbered time slots, a description will also be given further with respect to channel A alone, assuming that all input pulses to the channel B are zero. In this case the output *y* may be considered to be a waveform developed by a code conversion system which employs an integrating circuit, operating at *fo*/2 as a feedback circuit. For this reason, the d.c. component, the *fo*/2 component, and the components of integral multiples of *fo*/2 are suppressed.

A similar reasoning is applicable to channel B. In other words, the feedback circuit composed of circuit elements 31, 32, 41, 42, 51, and 52 may be regarded as a kind of resonant circuit tuned to *fo*/2, resulting in the suppression of the *fo*/2 component. This is an outstanding and unprecedented feature over conventional code conversion systems. More specifically, since the information signal is devoid of energy at frequency *fo*/2, this portion of the spectrum may be utilized for the transmission of timing information, narrowband information, or pilot signals for control.

Although the foregoing description is directed to the case where the feedback circuit contains two channels A and B, as will be appreciated by those versed in the art, a pulse train having a spectrum in which the *fo*/2 and 2*fo*/3 components have been suppressed is available by selecting one pulse in every three time slots using three corresponding channels A, B, and C, and switching alternately over three integrators.

This concept may be readily generalized to the case of *n* integrators for *n* channels and distributing switches for successively selecting every *n*th time slot. This produces a pulse train having a spectrum in which the components at frequencies equal to integral multiples of *fo*/*n* have been suppressed. The suppressed portions may be utilized for the same purpose as mentioned above.

Figures 3, 4:
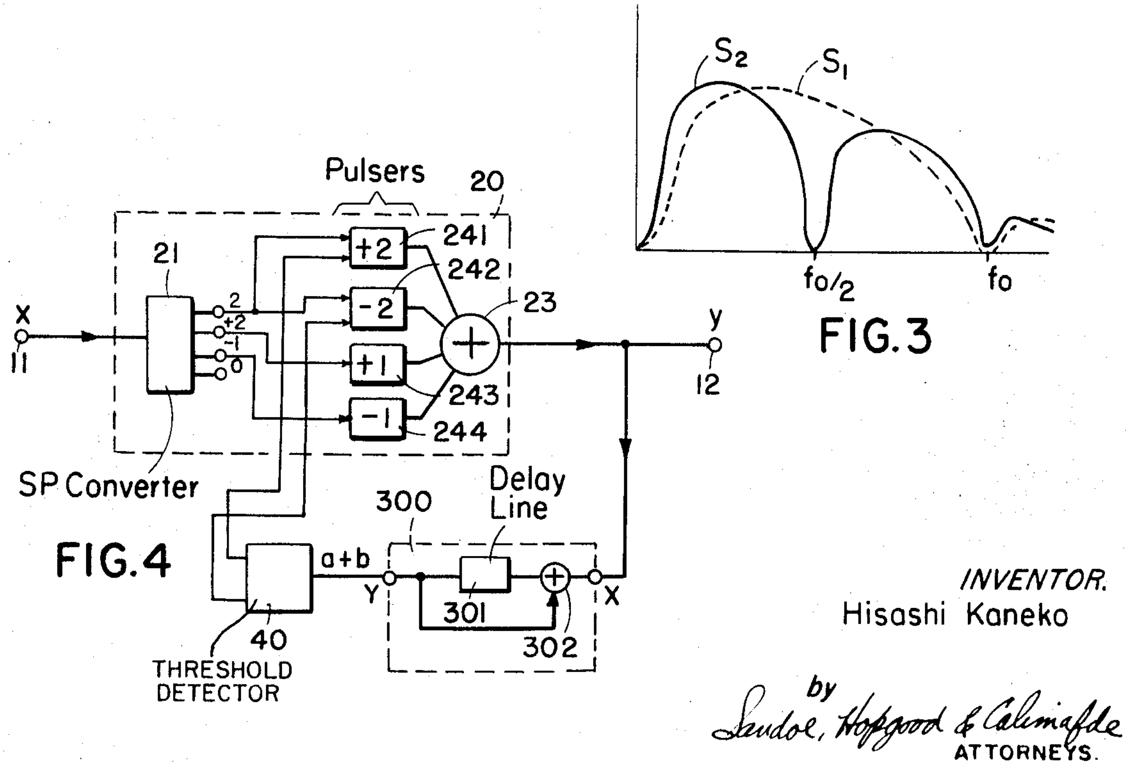
FIG. 3 is an example of the frequency spectrum of the multilevel code conversion signal according to the invention.
FIG. 4 is a schematic block diagram of another embodiment of this invention.

Referring now to an alternative embodiment, shown in FIG. 4, input terminal 11 is again provided for input information *x* which is again a multilevel information such as a quaternary code (similar to that explained in FIG. 1). Code converter 20 is similarly provided for the polarity reversal of all or a part of the levels of input information *x* by use of a feedback circuit.

It is again assumed that only the amplitude '2' of the quaternary code will be subjected to polarity control. As in the case of FIG. 1, an output 0 is developed for an input pulse with amplitude '0' while the pulsers 243 and 244 develop output '+1' and '−1' for input pulses '+1' and '−1', respectively. For an input *x* with amplitude '2', either pulser 241 or 242 is triggered, depending on the value of the control signal, to produce a pulse '+2' or '−2'.

Figure 5:
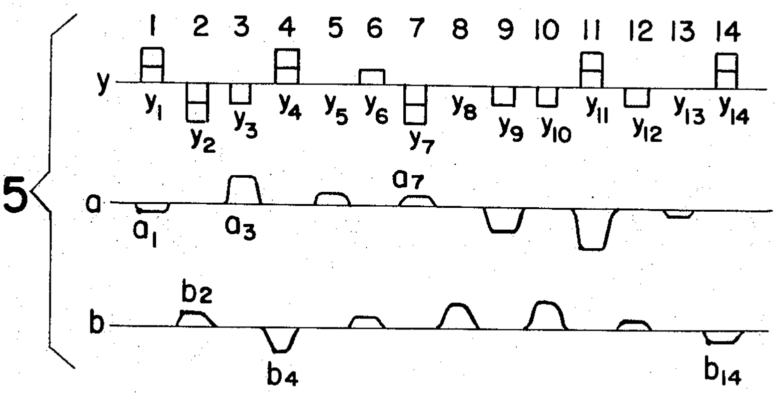
FIG. 5 shows waveform diagrams for illustrating the operation of the system shown in FIG. 4.

Polarity control is performed by the control signal as follows: the output pulses from pulses from pulsers 241, 242, 243, and 244 are added together by the adder 23 so that a multilevel (quinary in this case) pulse train *y* may be delivered to the output terminal 12. The output $y$ simultaneously delivered to a feedback circuit 300 composed of, for example, a delay line 301 and an adder 302 for obtaining the algebraic sum of the delay line output and the input signal at X through the feedback loop. Pulses $y$ pass through the adder 302 and the delay line 301 and are added to the input of the adder at X. If the delay time (2D) of the delay line 301 is equal to twice the clock period $T_o$ (i.e., the addition takes place with a delay of two clock periods), pulses $Y_1$, $Y_3$, $Y_5$ . . . in the odd-numbered slots are respectively added to the immediately preceding in succession with a delay of $2T_o$ in a manner to be described hereunder. This holds equally true for pulses in the even-numbered time slots: $y_2$, $y_4$, $y_6$ . . . are respectively added to the immediately preceding pulses after being delayed by a time interval equal to one time slot from the pulses in the odd-numbered slots. It may be said therefore that the feedback circuit 300 including the delay line has the function of an integrator for integrating pulses in the odd-numbered time slots and pulses in the even-numbered time slots separately on a time-division basis. Thus, the integrated waveforms for the odd- and even-numbered time slots may be depicted separately as illustrated by *a* and *b* in FIG. 5. Actually, the combined waveform of *a* and *b* is obtained at the output terminal Y.

Threshold detector 40 develops an output '+1' or '−1' depending on whether the integrated waveform $(a + b)$ is positive or negative. This detector is similarly composed of tunnel diodes or a Schmitt circuit as previously mentioned.

As has been described, the circuit arrangement according to this invention seeks to control pulses in the odd-numbered time slots and pulses in the even-numbered time slots substantially independently of each other.

How pulses in the odd-numbered time slots are controlled will first be explored. In time slot 1, pulse $a_1$ has a negative value, therefore a pulse '+2' is produced in response to an input pulse '2'. Since this pulse is added to the integrated value $a_1$, the value of $a_3$ in the third time slot rises two steps at the time point 2D seconds behind $a_1$. The same operation is repeated. In the odd-numbered time slot 7 where a pulse with amplitude '2' occurs, $a_7$ is positive, to produce a '−2'. In time slot 11, $a_{11}$ is negative. Thus a pulse '+2' occurs.

Similar control is performed for pulses in the even-numbered time slots as follows: in time slot 2, $b_2$ is positive. Therefore, a pulse '−2' is produced. In time slots 4 and 14, $b_4$ and $b_{14}$ are respectively negative, to produce pulses '+2'.

In this way, pulses in channels A and B are respectively controlled by use of the feedback circuit so as to minimize deviations of integrated values from the reference level. Thus, the so-called 'balanced' pulse train with the DC component eliminated is produced.

This embodiment also differs from that disclosed in the above mentioned copending application in that not only the DC component but also the desired frequency component (the $fo/2$ component in this embodiment) is suppressed.

Suppose now that all input pulses to the odd-numbered time slots are '2'. Then, this input apparently has the $fo/2$ component. Since these pulses are added to the immediately preceding pulses respectively in the aforementioned manner, the negative feedback circuit operates as follows: if a '+2' pulse occurs in time slot 1, a '−2' pulse occurs in time slot 3 and a '+2' pulse occurs in time slot 5. Therefore, the spectrum of the transmitting pulses will include the $fo/4$ component, if only the odd-numbered time slots are taken into account. A similar reasoning is applicable to pulses in the even-numbered time slots.

Although a description has been made of an example in which both DC and $fo/2$ components are suppressed for a particular pulsed input having the $fo/2$ component, the $fo/2$ component may be likewise suppressed for random input pulse trains in general.

Figure 10:
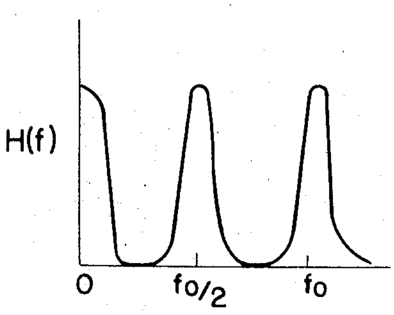
FIG. 10 illustrates an example of the transfer frequency characteristic of the feedback circuit.

Since the X-Y interval of the feedback circuit 300 constitutes a delay-line type resonant circuit tuned to $fo/2$, the transfer frequency characteristic $H(f)$ has peak values, as shown in FIG. 10, at zero frequency (DC), $fo/2$, $fo$, $3fo/2$, and further integral multiple of $fo/2$.

Since the threshold detector 40 may be an extremely high-gain amplifier, it is apparent that the negative feedback circuit tends to suppress the peak frequency components of $H(f)$. Therefore, code conversion takes place in the form of suppressing the $fo/2$ component together with the DC and $fo$ components as demonstrated by the spectrum $S_2$ of the transmitting pulses shown in FIG. 3. As illustrated, the spectrum $S_2$ manifests marked differences from the balanced code spectrum $S_1$ such as exists in the above-mentioned copending application.

Figure 6:
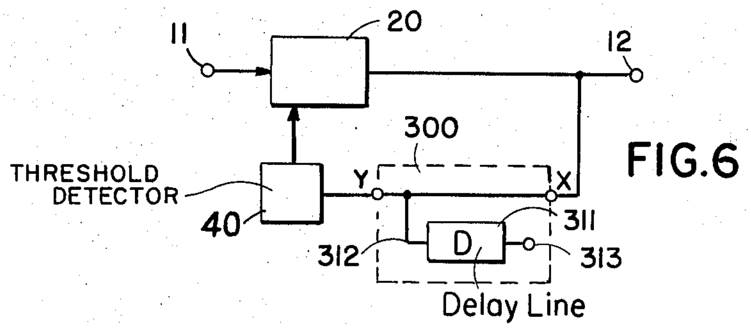
FIG. 6 is a schematic block diagram of a still another embodiment of this invention.

In addition to the feedback circuit shown in FIG. 4, which is substantially a delay-line type resonant circuit tuned to $fo/2$, many other feedback circuit structures are conceivable. FIG. 6 illustrates another embodiment, wherein elements 20 and 40 are the same as those similarly designated in FIG. 4, whereas the feedback circuit 300 (between X-Y) consists of a delay line 311 with a delay time $D = T_o$ ($T_o$ = clock period = $1/fo$). As illustrated, the delay line has open-circuited opposite ends. Therefore an incoming pulse to one open end 312 from X is reflected at the other open end 313 and reflection takes place again at 312. Thus, only the $fo/2$ component is eventually selected by the delay line type resonant circuit 300. This is an example in which the same point 312 serves as the input and the output.

Figure 7:
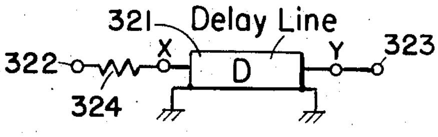
FIGS. 7, 8 and 9 illustrate, respectively, three variations in the feedback circuit according to the invention.

FIG. 7 illustrates still another embodiment of a feedback circuit consisting of a delay line of length D, with both ends open-circulated. It will be understood that a pulse is applied to the delay line from X via a high impedance circuit and an integrated pulse is derived from Y through a high impedance. Since both X and Y are effectively open-ended, the $fo/2$ component reflects repeatedly in the delay line and is eventually selected.

Figure 8:
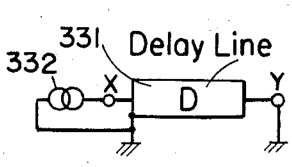

Referring to FIG. 8, it will be seen that the pulse train $y$ is applied to input terminal X from a current source 332 and a current output is derived from output terminal Y. This feedback circuit is a resonant circuit tuned to $fo/2$, because the opposite ends are short-circuited. As will be evident from the foregoing, any kind of feedback circuit may be used, provided that it contains a resonant circuit (or resonant circuits) tuned to the frequency, or frequencies to be suppressed.

While any of the delay-line type resonant circuits shown in FIGS. 4, 6, 7, and 8 is designed to be highly favorable to simultaneous suppression of the DC component, the $fo/2$ component, and its integral multiple components, the resonant circuit is not to be considered restricted to the delay-line type.

Figure 9:
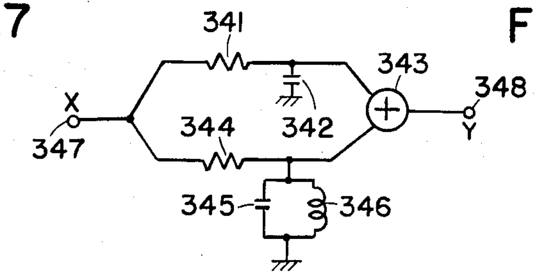

FIG. 9 illustrates an example of a feedback circuit including a lumped-constant resonant circuit composed of capacitive element 345 and inductive element 346 tuned to $fo/2$. Since DC balance is not achieved, there is the need to add the output of the resonant circuit to the output of an annexed R-C integrating circuit (341 and 342) by the adder 343. Irrespective of whether the DC component is greater or smaller than the $fo/2$ component, a large output is produced from the feedback circuit shown in FIG. 9. Accordingly, code conversion is performed by controlling the negative feedback circuit of FIG. 6 in such a way that these frequency components are suppressed.

As can easily be appreciated by those skilled in the art, a need arises for suitably controlling the delay time or the phase relations of the feedback circuit with respect to the clock period to improve the system stability.

Although the foregoing description is directed to the case of suppressing the $fo/2$ component, any desired frequency component may be suppressed. In order to suppress the $fo/3$ component, for example, the circuits of FIGS. 1, 4, 6, 7, and 8 would be modified as follows: the circuit of FIG. 1 should be designed so that the integrating circuit contains three channels; the circuit of FIG. 4 would be designed so that the delay time of 301 becomes $3T_o$ (where $T_o$ = clock period); and the circuits of FIGS. 6, 7 and 8 must be designed so that the delay time of 311, 321, 331 become become $3/2\ T_o$, respectively. Then, in all these cases, the DC, the $fo/3$, and its integral multiple frequency components would be suppressed. Generally, an output pulse train having its frequency spectrum suppressed in the DC, $fo/n$, and its integral multiple frequency components can be obtained by designing the delay time of the delay-line type resonant circuit equal to $n\ T_o$. Similarly, the integral sub-multiple frequency components of the frequency $fo$ can be suppressed with the lumped constant resonant circuit structure as shown in FIG. 9, provided that a plurality of such circuits are connected in parallel.

What is claimed is:

1. In a multilevel signal transmission system of the type for transmitting a code signal representative of an information signal to be transmitted in the form of a train of multilevel pulses spaced by a clock pulse interval the improvement comprising:
   - plural integrating means for producing the integral of the amplitude of each of $n$ groups of pulses, where $n$ is any integer greater than one, each of said pulse groups being extracted from said train of multilevel pulses at a predetermined interval given by $n$ times said clock pulse interval, said groups having a time lag equal to said clock pulse interval from one group to another; and
   - plural means each responsive to an associated integral of the amplitude of the multilevel pulses in an associated one of said pulse groups for inverting the polarity of at least one level of said multilevel pulses so as not to produce in the total frequency spectrum of said train of multilevel pulses any direct current component and the frequency spectrum components centered at the inverse number of said integral multiple of said clock pulse interval.

2. In a multilevel signal transmission system of the type for transmitting a code signal representative of an information signal to be transmitted in the form of a train of multilevel pulses spaced by a clock pulse interval the improvement comprising:
   - means for producing the integral of the amplitude of each of a plurality of groups of pulses, each of said groups having a predetermined clock interval equal to an integral multiple of said clock pulse interval, said groups having a time lag of one clock pulse interval from one group to another; and
   - means responsive to said integral of the amplitude of the multilevel pulses in each of said groups for inverting the polarity of at least one level of said multilevel pulses so as not to produce any direct current component in said train of multilevel pulses, whereby the frequency spectrum components centered at the inverse number of said integral multiple of said clock pulse interval are eliminated from the total frequency spectrum components of said pulse train, wherein said integration producing means comprises:
   - a first switching means for distributing said train of multilevel pulses into said pulse groups;
   - a plurality of integrating circuits respectively assigned to said pulse groups;
   - means for determining the polarity of the output of each of said integrating circuits; and
   - a second switching means for supplying the outputs of said polarity-discriminating means to said polarity-inverting means in timed relation to said first switching means.

3. A multilevel signal transmission system as claimed in claim 1, wherein said time integration producing means comprises:
   - means for giving said multilevel pulses a delay time equal to $n$ times said clock pulse interval;
   - means for adding said multilevel pulses to said delayed multilevel pulses; and
   - means for determining the polarity of the output of said delay line.

4. A multilevel signal transmission system as claimed in claim 2, wherein the number of said pulse groups is two.

5. A multilevel signal transmission system as claimed in claim 3, wherein said delay time means comprises a delay line of time length equal to $n$ times said clock pulse interval, and having an input connected to said adding means and an output connected to one of the inputs of said adding means and to the input of said polarity determining means.

6. A multilevel signal transmission system as claimed in claim 3, wherein said delay time means comprises a delay line having a delay time length given by $n/2$ times said clock pulse interval, one end of said delay line being open-circuited, and another end of said delay line being connected in an impedance matching condition to the input of said polarity-determining means and to the output of said polarity-inverting means.

7. A multilevel signal transmission system as claimed in claim 3, wherein said delay time means comprises a delay line having one end connected in an open-circuited configuration to the output of said polarity-converting means and having its other end connected in an open-circuited configuration to the input of said polarity-determining means.

8. A multilevel signal transmission system as claimed in claim 3, wherein said delay time means comprises a delay line having one end connected in a short-circuited configuration to the input of said polarity-inverting means to receive said train of multilevel pulses in the form of current signals and having its other end connected in a short-circuited configuration to the input of said polarity-determining means.

* * * * *